(12) United States Patent
Kondo et al.

(10) Patent No.: US 9,671,590 B2
(45) Date of Patent: Jun. 6, 2017

(54) IMAGING LENS AND IMAGING APPARATUS EQUIPPED WITH THE IMAGING LENS

(71) Applicant: FUJIFILM Corporation, Tokyo (JP)

(72) Inventors: Masato Kondo, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 41 days.

(21) Appl. No.: 14/746,842

(22) Filed: Jun. 23, 2015

(65) Prior Publication Data

US 2015/0309287 A1    Oct. 29, 2015

Related U.S. Application Data

(63) Continuation of application No. PCT/JP2013/007226, filed on Dec. 9, 2013.

(60) Provisional application No. 61/755,041, filed on Jan. 22, 2013.

(30) Foreign Application Priority Data

Dec. 25, 2012    (JP) ................................. 2012-281684

(51) Int. Cl.
  *G02B 3/02* (2006.01)
  *G02B 13/18* (2006.01)
  *G02B 13/00* (2006.01)
  *G02B 9/60* (2006.01)

(52) U.S. Cl.
  CPC ........... *G02B 13/0045* (2013.01); *G02B 9/60* (2013.01); *G02B 13/18* (2013.01)

(58) Field of Classification Search
  CPC ............ G02B 13/18; G02B 9/60; G02B 3/04
  USPC ........................................ 359/642, 708, 714
  See application file for complete search history.

(56) References Cited

U.S. PATENT DOCUMENTS

| 2012/0087019 | A1 | 4/2012 | Tang et al. |
| 2013/0021678 | A1 | 1/2013 | Tsai et al. |
| 2013/0182336 | A1 | 7/2013 | Hsu et al. |
| 2013/0242412 | A1* | 9/2013 | Uchida et al. ................. 359/714 |
| 2015/0293332 | A1* | 10/2015 | Kondo et al. ................. 359/714 |

FOREIGN PATENT DOCUMENTS

| CN | 202330845 | 7/2012 |
| CN | 202583582 | 12/2012 |

* cited by examiner

*Primary Examiner* — James Greece
(74) *Attorney, Agent, or Firm* — Jianq Chyun IP Office

(57) ABSTRACT

An imaging lens consists of five lenses, including: a first lens having a positive refractive power and a meniscus shape with a convex surface toward the object side, a second lens having a biconcave shape with the surface having the radius of curvature with the smaller absolute value toward the image side, a third lens having a meniscus shape with a convex surface toward the object side, a fourth lens having a negative refractive power and a meniscus shape with a convex surface toward the image side, and a fifth lens having a negative refractive power and a meniscus shape with a concave surface toward the image side, the image-side surface thereof having at least one inflection point, disposed in this order from the object side.

20 Claims, 10 Drawing Sheets

IMAGING LENS AND IMAGING APPARATUS EQUIPPED WITH THE IMAGING LENS

CROSS-REFERENCE TO RELATED APPLICATIONS

This application is a Continuation of PCT International Application No. PCT/JP2013/007226 filed on Dec. 9, 2013, which claims priority under 35 U.S.C. §119(a) to Japanese Patent Application No. 2012-281684 filed on Dec. 25, 2012 and U.S. Provisional Application No. 61/755,041 filed on Jan. 22, 2013. Each of the above application(s) is hereby expressly incorporated by reference, in its entirety, into the present application.

BACKGROUND

Field of the Disclosure

The present disclosure is related to a fixed focus imaging lens for forming optical images of subjects onto an image sensor such as a CCD (Charge Coupled Device) and a CMOS (Complementary Metal Oxide Semiconductor). The present disclosure is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

Description of the Related Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Image sensors such as CCD's and CMOS's are employed in these devices having photography functions. Recently, miniaturization of these image sensors is advancing, and there is demand for miniaturization of the entirety of the photography devices as well as imaging lenses to be mounted thereon. At the same time, the number of pixels in image sensors is increasing, and there is demand for high resolution and high performance of imaging lenses. Performance corresponding to 5 megapixels or greater, and more preferably 8 megapixels or greater, is desired.

In response to such demands, imaging lenses having a five or six lens configuration, which is a comparatively large number of lenses, may be considered. For example, Patent Documents 1 and 2 (Chinese Utility Model Publication No. 202330845 and U.S. Unexamined Patent Application Publication No. 20120087019) propose an imaging lens with a five-lens configuration, including a first lens having a positive refractive power, a second lens having a negative refractive power, a third lens having a positive refractive power, a fourth lens having a negative refractive power, and a fifth lens having a negative refractive power, disposed in this order from the object side.

SUMMARY

Meanwhile, there is demand for imaging lenses for use in apparatuses which are becoming thinner such as cellular telephones, smart phones, and tablet terminals to have shortened total lengths. Accordingly, there is demand for the imaging lenses disclosed in Patent Documents 1 and 2 listed above to be have an even shorter total length.

The present disclosure has been developed in view of the foregoing points. The present disclosure provides an imaging lens that can realize reduction in the total length while being capable of realizing high imaging performance from a central angle of view to peripheral angles of view. The present disclosure further provides an imaging apparatus equipped with the lens, which is capable of obtaining high resolution photographed images.

A first imaging lens of the present disclosure consisting of five lenses, including:

a first lens having a positive refractive power and a meniscus shape with a convex surface toward the object side;

a second lens having a biconcave shape with the surface having the radius of curvature with the smaller absolute value toward the image side;

a third lens having a meniscus shape with a convex surface toward the object side;

a fourth lens having a negative refractive power and a meniscus shape with a convex surface toward the image side; and a fifth lens having a negative refractive power and a meniscus shape with a concave surface toward the image side, the image-side surface having at least one inflection point, disposed in this order from the object side, wherein the imaging lens satisfies conditional formula below:

$$-0.45 < f/f45 < -0.23 \qquad (1\text{-}1),$$

where, f: the focal length of the entire system, and f45: the combined focal length of the fourth lens and the fifth lens.

A second imaging lens of the present disclosure consisting of five lenses including:

a first lens having a positive refractive power and a meniscus shape with a convex surface toward the object side;

a second lens having a biconcave shape with the surface having the radius of curvature with the smaller absolute value toward the image side;

a third lens having a meniscus shape with a convex surface toward the object side;

a fourth lens having a negative refractive power and a meniscus shape with a convex surface toward the image side;

a fifth lens having a negative refractive power and a meniscus shape with a concave surface toward the image side, the image-side surface thereof having at least one inflection point, disposed in this order from the object side, wherein the imaging lens satisfies conditional formula below:

$$0.8 < f/f1 \le 1.268 \qquad (6\text{-}2),$$

where, f: the focal length of the entire system, and f1: the focal length of the first lens.

According to the imaging lens of the present disclosure, the configuration of each lens element of the first lens through the fifth lens is optimized within a lens configuration having five lenses as a whole. Therefore, a lens system that can achieve a shortened total length while having high imaging performance can be realized.

Note that in the imaging lens of the present disclosure, the expression consisting of five lenses" means that the imaging lens of the present disclosure may also include lenses that practically have no power, optical elements other than lenses such as a stop and a cover glass, and mechanical components such as lens flanges, a lens barrel, a camera shake correcting mechanism, ec., in addition to the five lenses. In addition, the shapes of the surfaces and the signs of the refractive powers of the above lenses will be considered in the paraxial region for those that include aspherical surfaces.

The optical performance of the imaging lens of the present disclosure can be further improved by adopting the following favorable configurations.

It is preferable for the imaging lens of the present disclosure to satisfy any one of conditional formulae (1) through (9) below. Note that as a preferable aspect of the present disclosure, the imaging lens of the present disclosure may satisfy any one or arbitrary combination of conditional formulae (1) through (9).

$$-0.7 < f/f45 < -0.1 \quad (1)$$

$$-0.45 < f/f45 < -0.23 \quad (1\text{-}1)$$

$$0.5 < f \cdot \tan \omega / R5r < 10 \quad (2)$$

$$1.5 < f \cdot \tan \omega / R5r < 4.5 \quad (2\text{-}1)$$

$$1 < f3/f1 < 12 \quad (3)$$

$$2 < f3/f1 < 10 \quad (3\text{-}1)$$

$$-1 < (R3f - R3r)/(R3f + R3r) < 0 \quad (4)$$

$$-0.7 < (R3f - R3r)/(R3f + R3r) < 0 \quad (4\text{-}1)$$

$$0 < (R2r - R3f)/(R2r + R3f) < 1 \quad (5)$$

$$0 < (R2r - R3f)/(R2r + R3f) < 0.5 \quad (5\text{-}1)$$

$$0.8 < f/f1 < 1.5 \quad (6)$$

$$0.8 < f/f1 \le 1.268 \quad (6\text{-}2)$$

$$0.9 < f/f1 \le 1.268 \quad (6\text{-}3)$$

$$0.1 < f/f3 < 0.6 \quad (7)$$

$$0.1 < f/f3 < 0.5 \quad (7\text{-}1)$$

$$-1 < f/f2 < -0.2 \quad (8)$$

$$-0.8 < f/f2 < -0.4 \quad (8\text{-}1)$$

$$0.05 < D7/f < 0.2 \quad (9)$$

where,
f45: the combined focal length of the fourth lens and the fifth lens,
f: the focal length of the entire system,
ω: a half angle of view,
R5r: the paraxial radius of curvature of the image-side surface of the fifth lens,
f3: the focal length of the third lens,
f1: the focal length of the first lens,
R3 f: the paraxial radius of curvature of the object-side surface of the third lens,
R3r: the paraxial radius of curvature of the image-side surface of the third lens,
R2r: the paraxial radius of curvature of the image-side surface of the second lens,
f2: the focal length of the second lens, and
D7: the distance between the third lens and the fourth lens along the optical axis.

An imaging apparatus according to the present disclosure is equipped with the imaging lens of the present disclosure.

The imaging apparatus according to the present disclosure is capable of obtaining high-resolution imaging signals based on optical images formed by the imaging lens of the present disclosure.

According to the imaging lens of the present disclosure, the configuration of each lens element is optimized within a lens configuration having five lenses as a whole, and the shape of particularly the third lens is favorably configured. Therefore, a lens system that can achieve shortening the total length while having high imaging performance from a central angle of view to peripheral angles of view can be realized.

Further, the imaging apparatus of the present disclosure outputs imaging signals corresponding to optical images formed by the imaging lens of the present disclosure having high imaging performance. Therefore, the imaging apparatus of the present disclosure is capable of obtaining high resolution photographed images.

Figure 6:
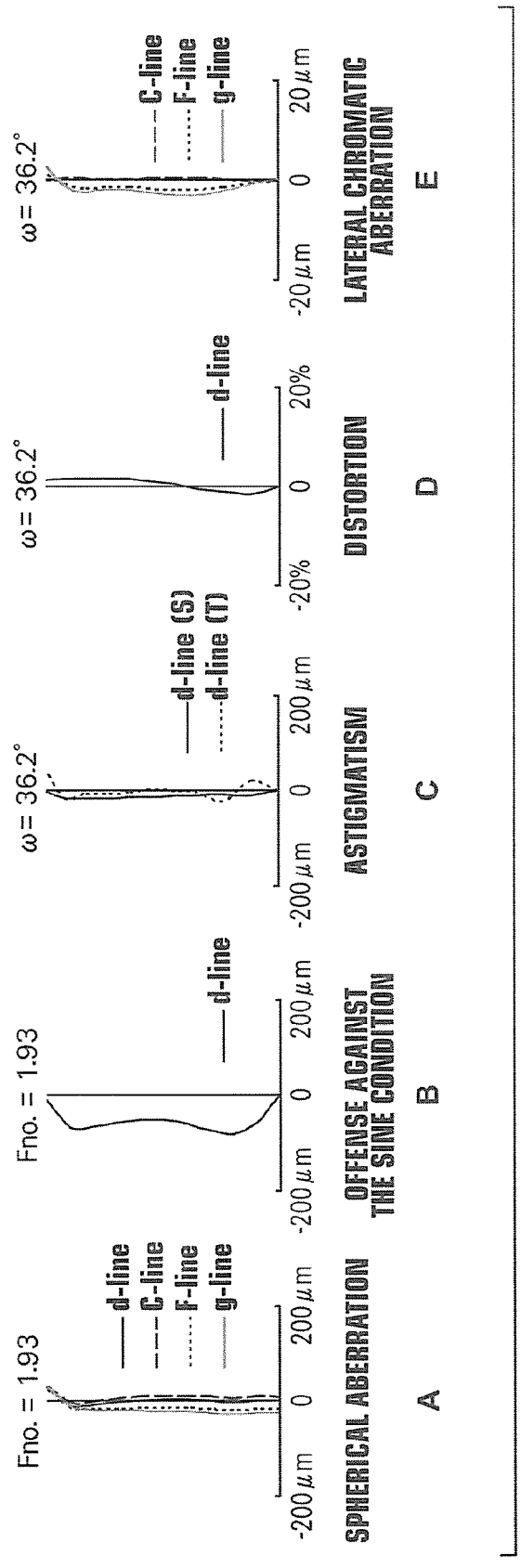

A through E of FIG. 6 are diagrams that illustrate various aberrations of the imaging lens according to Example 1 of the present disclosure, wherein A illustrates spherical aberration, B illustrates offense against the sine condition, C illustrates astigmatism (field curvature), D illustrates distortion, and E illustrates lateral chromatic aberration.

Figure 7:
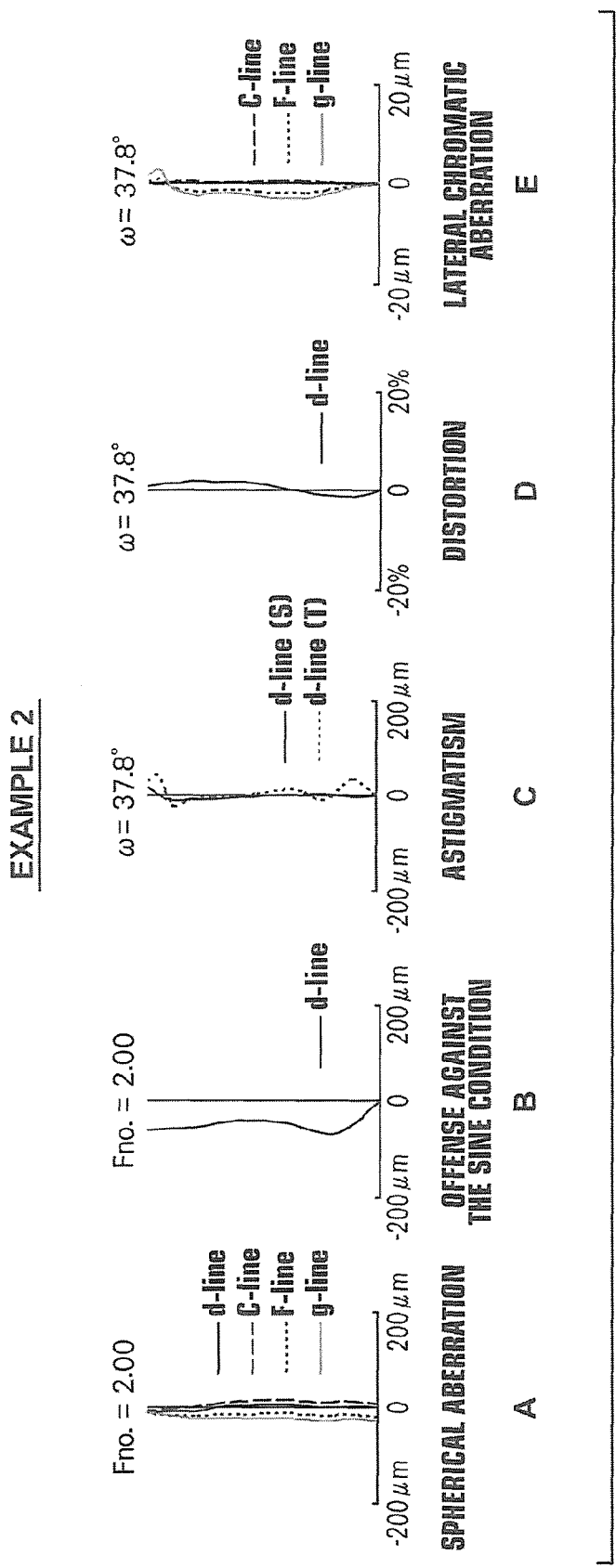

A through E of FIG. 7 are diagrams that illustrate various aberrations of the imaging lens according to Example 2 of the present disclosure, wherein A illustrates spherical aberration, B illustrates offense against the sine condition, C illustrates astigmatism (field curvature), D illustrates distortion, and E illustrates lateral chromatic aberration.

Figure 8:
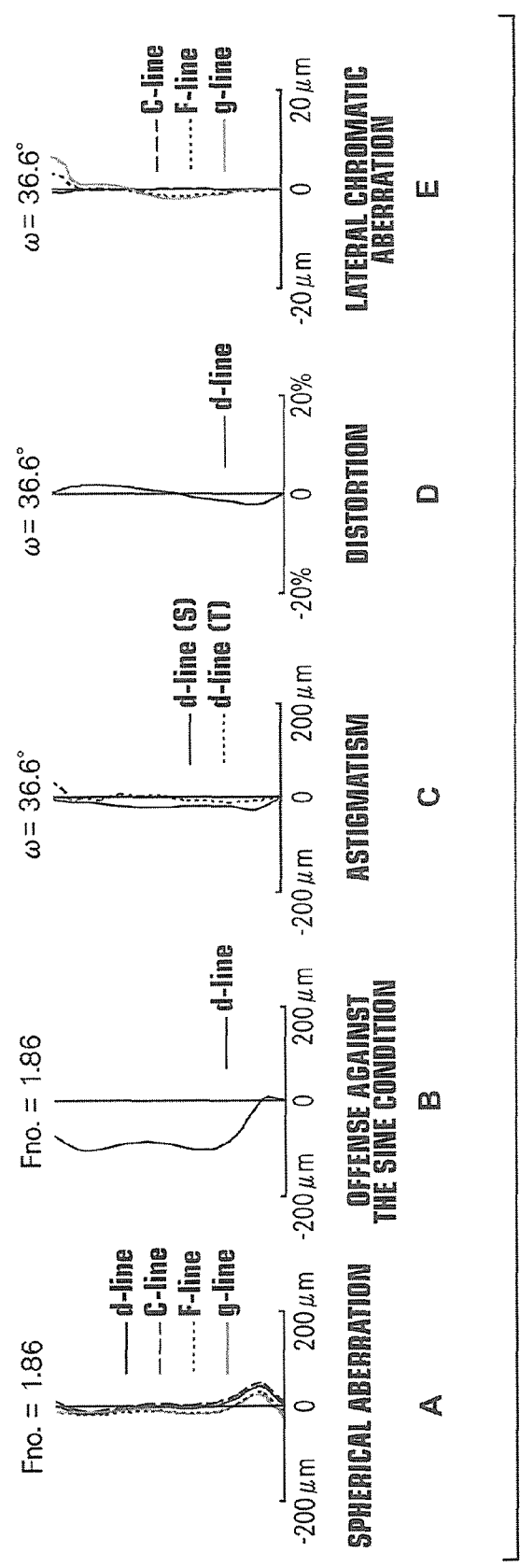

A through E of FIG. 8 are diagrams that illustrate various aberrations of the imaging lens according to Example 3 of the present disclosure, wherein A illustrates spherical aberration, B illustrates offense against the sine condition, C illustrates astigmatism (field curvature), D illustrates distortion, and E illustrates lateral chromatic aberration.

Figure 9:
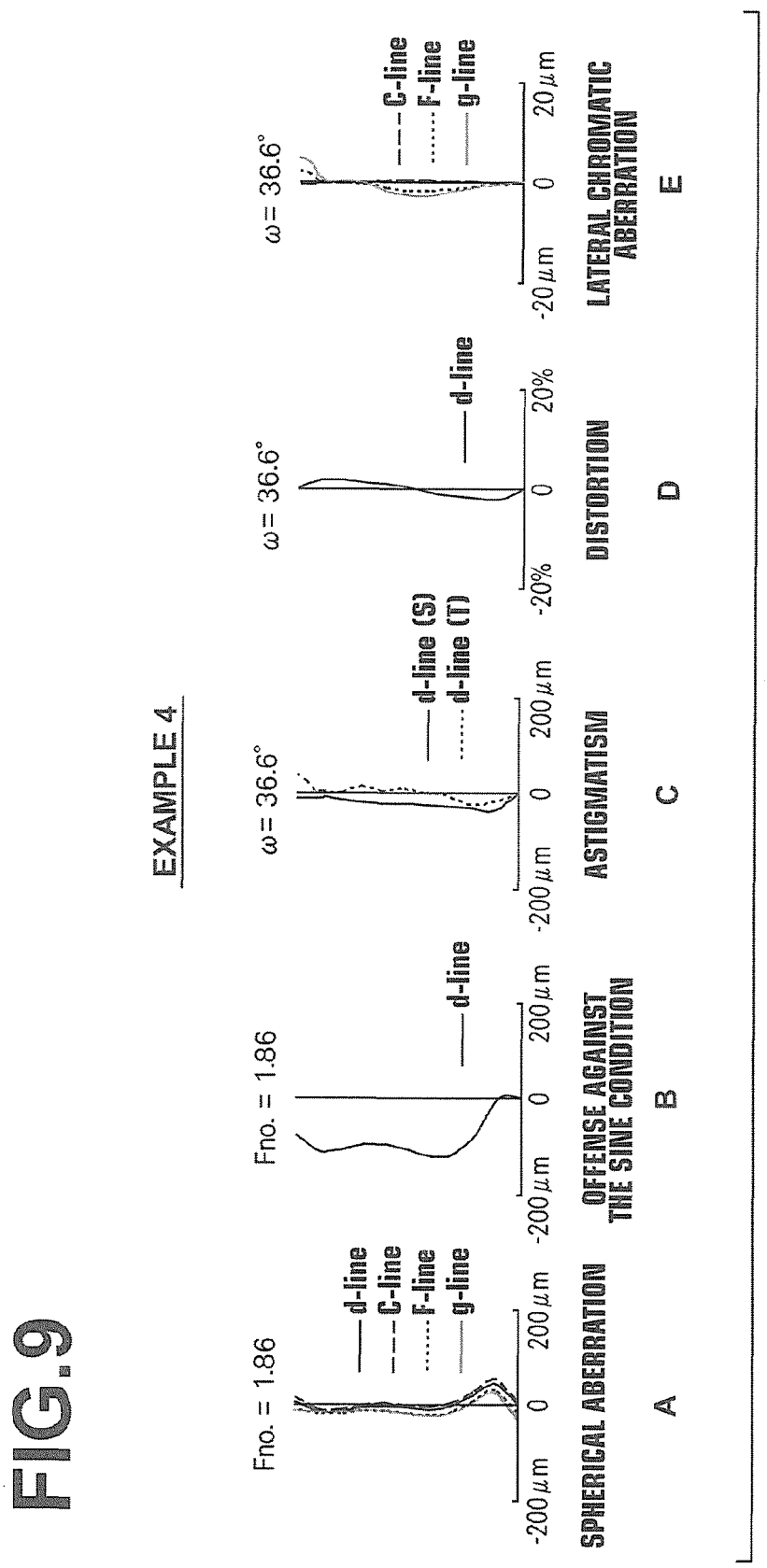

A through E of FIG. 9 are diagrams that illustrate various aberrations of the imaging lens according to Example 4 of the present disclosure, wherein A illustrates spherical aberration, B illustrates offense against the sine condition, C illustrates astigmatism (field curvature), D illustrates distortion, and E illustrates lateral chromatic aberration.

Figure 10:
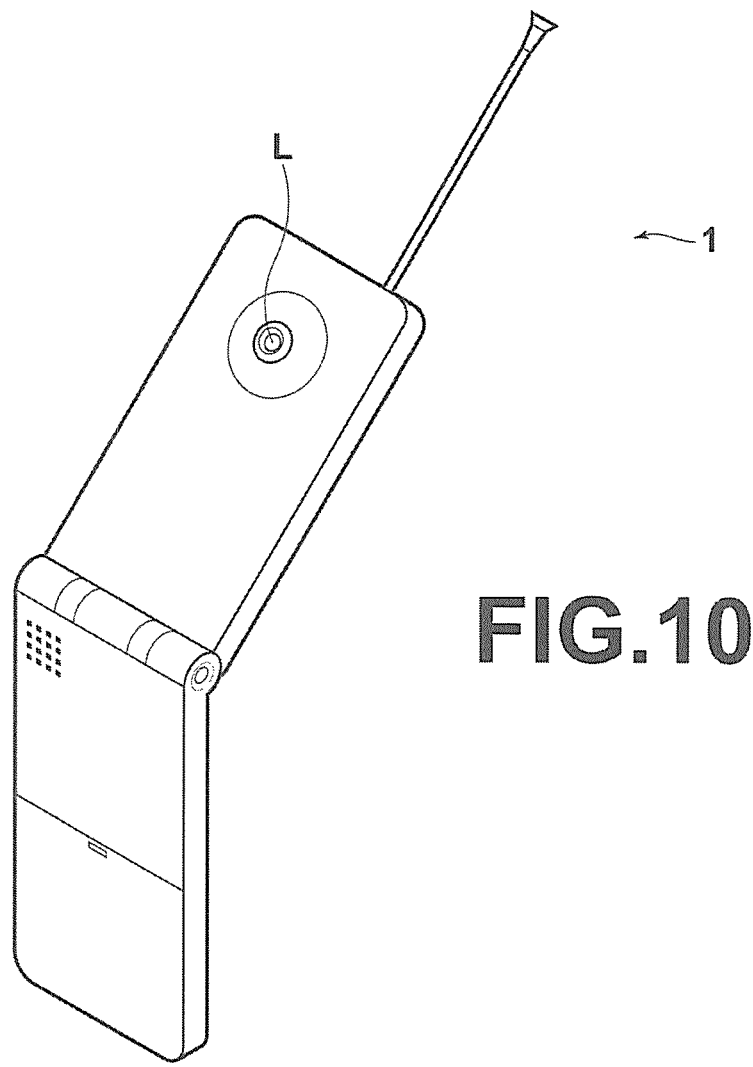

FIG. 10 is a diagram that illustrates a cellular telephone as an imaging apparatus equipped with the imaging lens of the present disclosure.

Figure 11:
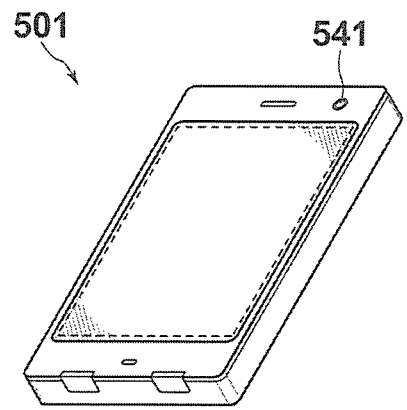

FIG. 11 is a diagram that illustrates a smart phone as an imaging apparatus equipped with the imaging lens of the present disclosure.

DESCRIPTION OF THE PREFERRED EMBODIMENTS

Hereinafter, embodiments of the present disclosure will be described in detail with reference to the attached drawings.

Figure 1:
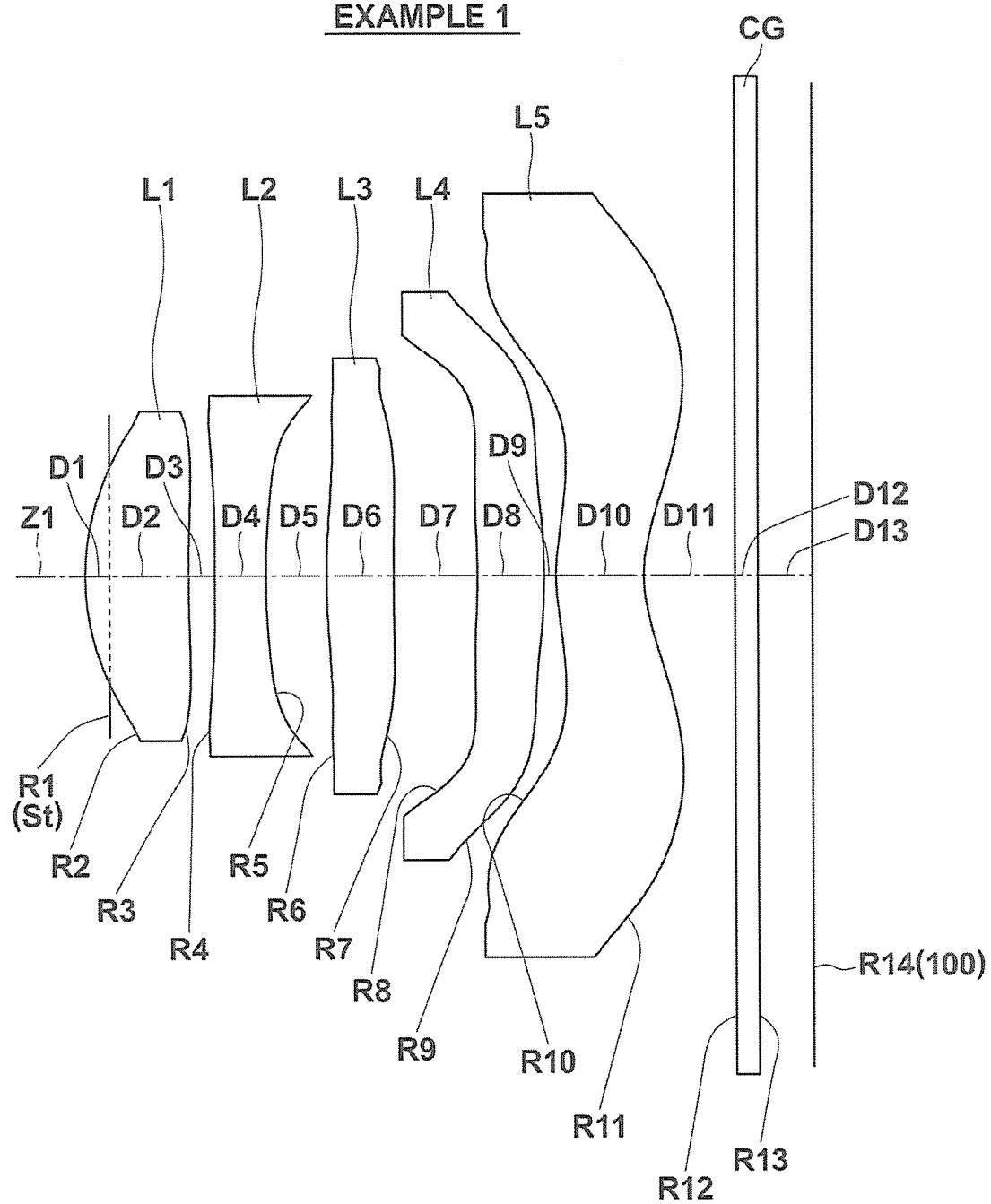
FIG. 1 is a sectional diagram that illustrates a first example of the configuration of an imaging lens according to an embodiment of the present disclosure, and corresponds to a lens of Example 1.
Figure 2:
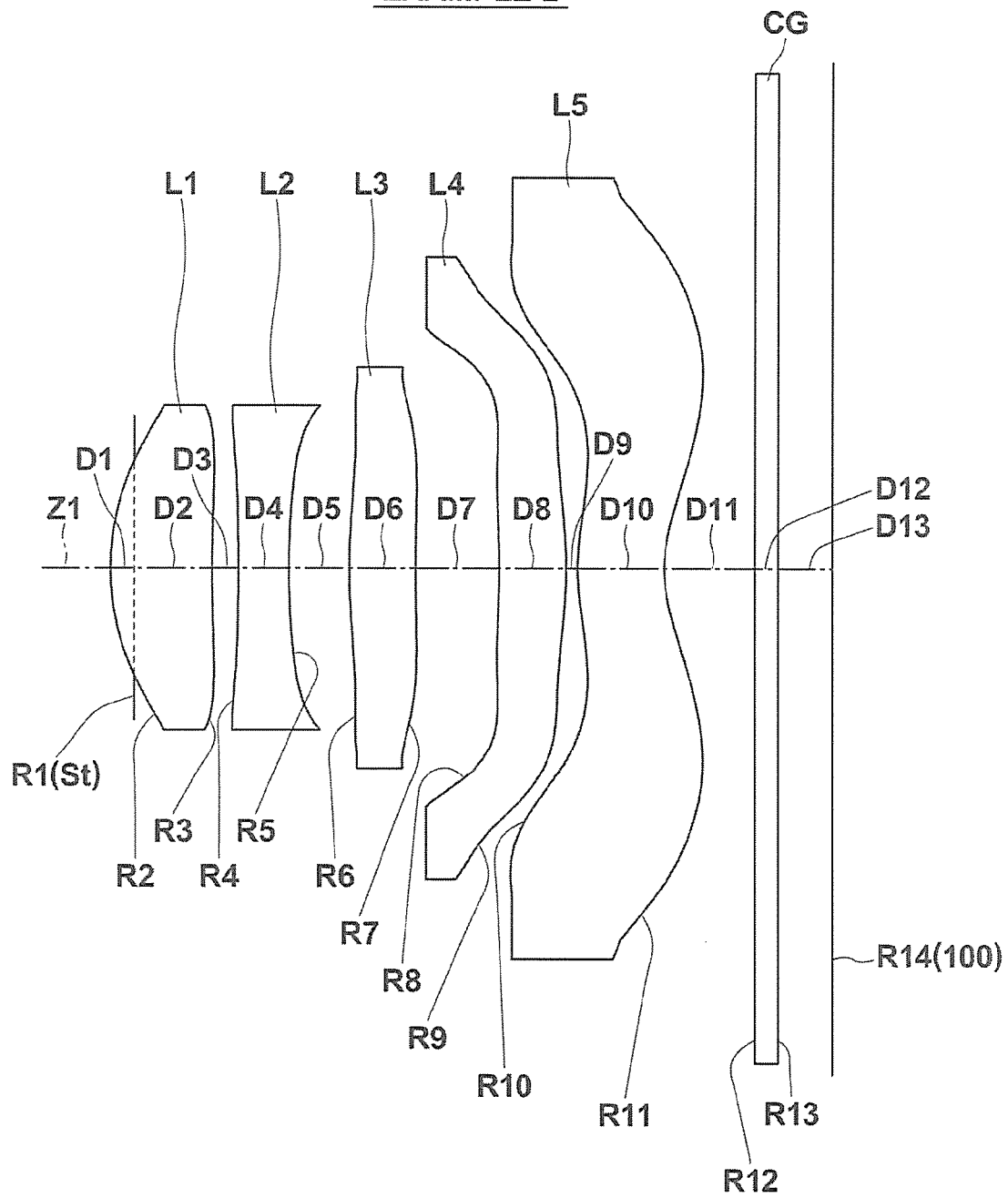
FIG. 2 is a sectional diagram that illustrates a second example of the configuration of an imaging lens according to an embodiment of the present disclosure, and corresponds to a lens of Example 2.
Figure 3:
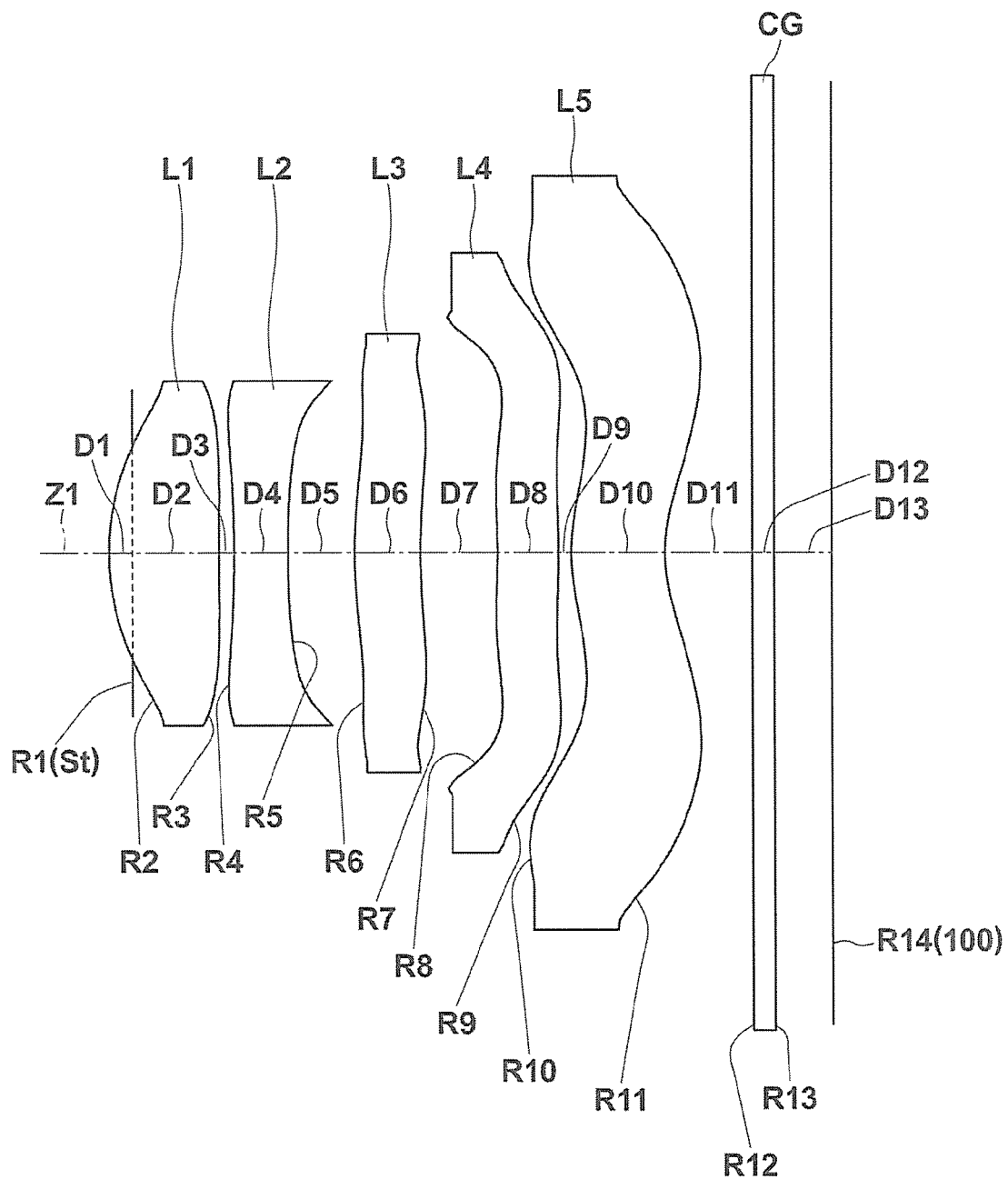
FIG. 3 is a sectional diagram that illustrates a third example of the configuration of an imaging lens according to an embodiment of the present disclosure, and corresponds to a lens of Example 3.
Figure 4:
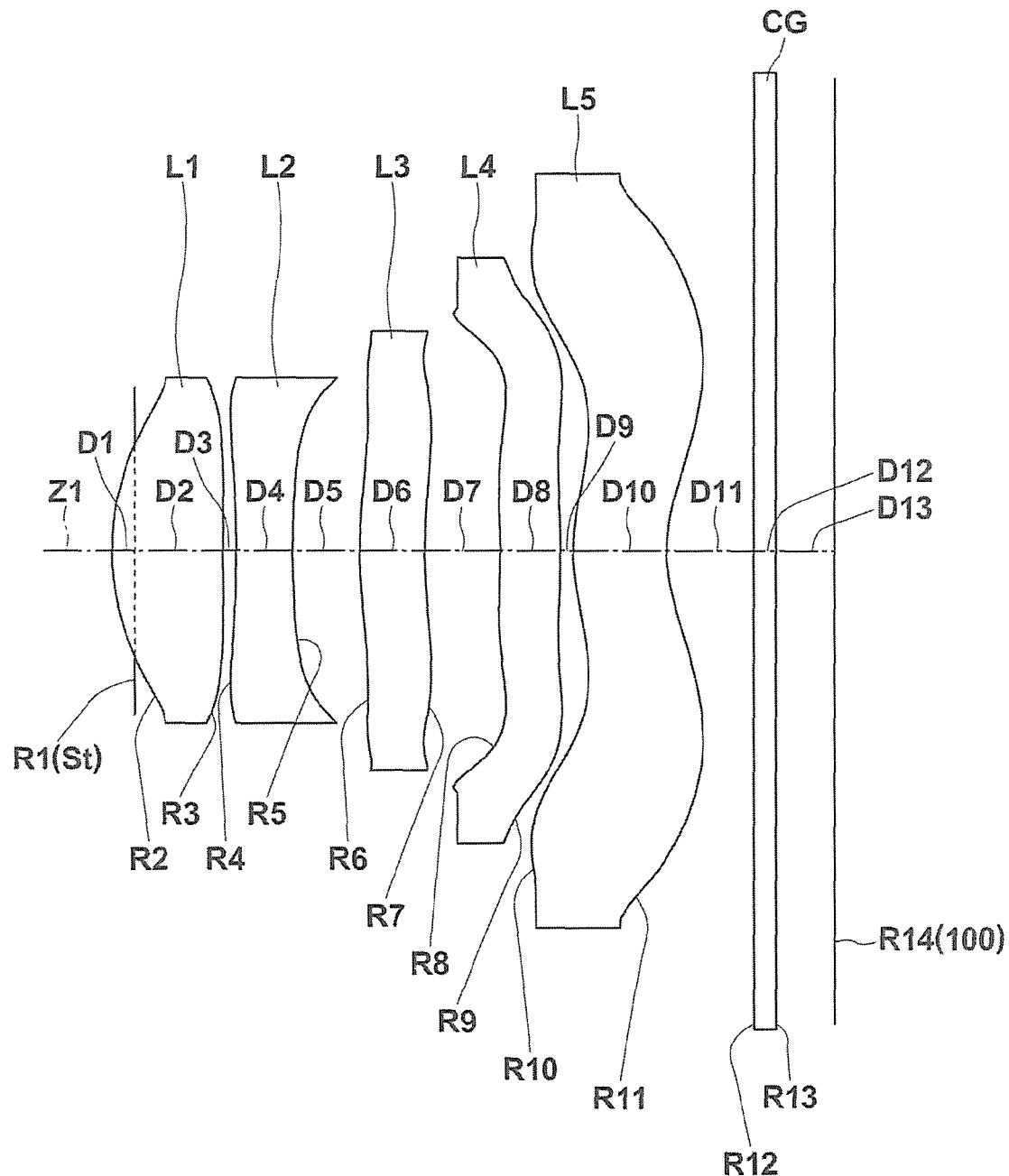
FIG. 4 is a sectional diagram that illustrates a fourth example of the configuration of an imaging lens according to an embodiment of the present disclosure, and corresponds to a lens of Example 4.
Figure 5:
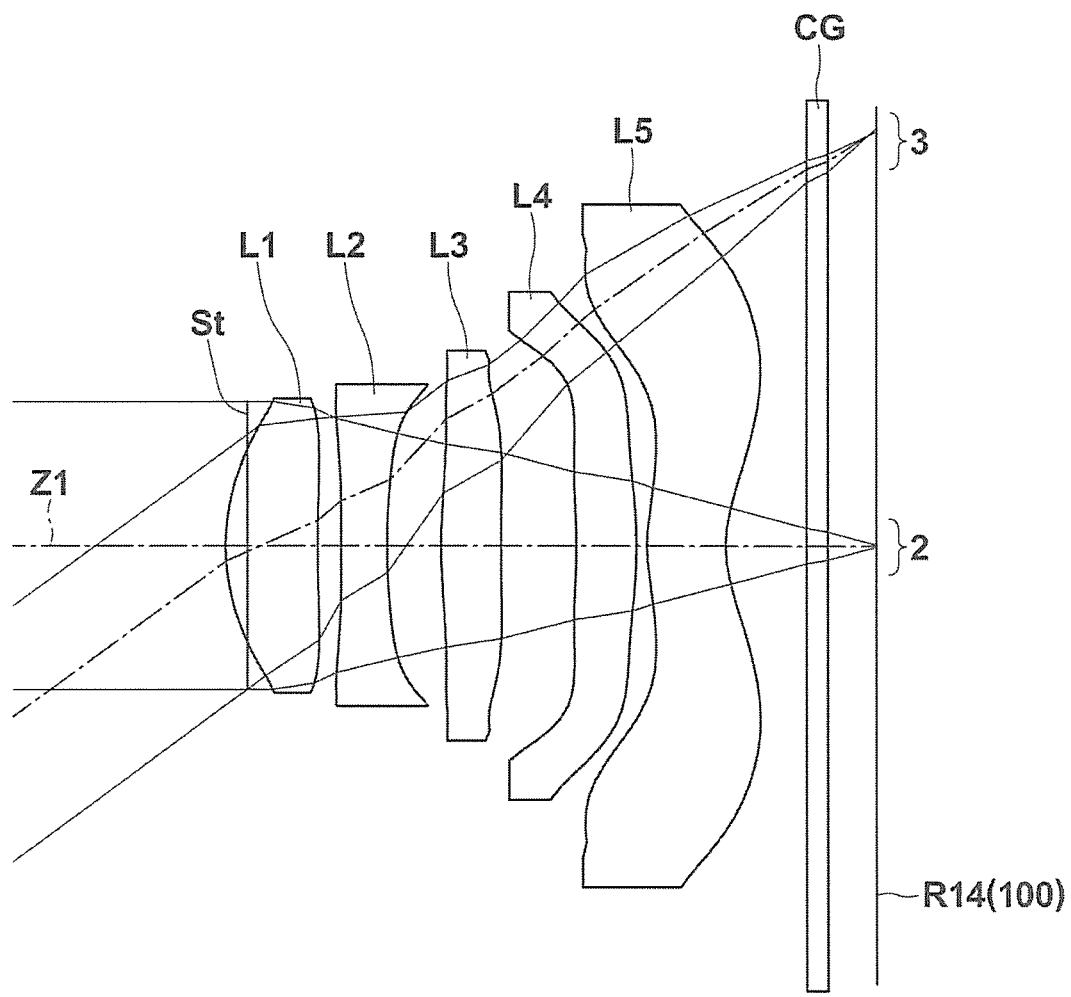
FIG. 5 is a diagram that illustrates the paths of light rays that pass through the imaging lens illustrated in FIG. 1.

FIG. 1 illustrates a first example of the configuration of an imaging lens according to a first embodiment of the present disclosure. This example of the configuration corresponds to the lens configuration of a first Numerical Example 1 (Table 1 and Table 2), to be described later. Similarly, FIG. 2 through FIG. 4 are sectional diagrams that illustrate second through fourth examples of the configurations corresponding to the imaging lenses of the second embodiment through the fourth embodiment (to be described later). The second through fourth examples of the configurations correspond to the lens configurations of the second through the fourth Numerical Examples (Table 3 through Table 8) to be described later. In FIGS. 1 through 4, the symbol Ri represents the radii of curvature of ith surfaces, i being lens surface numbers that sequentially increase to the image side (imaging side), with the surface of most-object-side lens element designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 4 will also be described as necessary. In addition, FIG. 5 is a diagram that illustrates the paths of light rays that pass through the imaging lens L of FIG. 4, and illustrates the paths of axial light rays 2 and light rays 3 of a maximum angle of view exited from an object at an infinity distance.

The imaging lens L of the embodiment of the present disclosure is favorably employed in various imaging devices that employ image sensors such as a CCD and a CMOS. The imaging lens L of the embodiment of the present disclosure is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, and a fifth lens L5, disposed in this order from the object side.

FIG. 10 schematically illustrates a cellular telephone as an imaging apparatus 1 according to an embodiment of the present disclosure. The imaging apparatus 1 of the embodiment of the present disclosure is equipped with the imaging lens L according to the embodiment of the present disclosure and an image sensor 100 (refer to FIG. 1) such as a CCD that outputs image signals corresponding to optical images formed by the imaging lens L. The image sensor 100 is provided at an image formation plane (imaging surface R14) of the imaging lens L.

FIG. 11 schematically illustrates a smart phone as an imaging apparatus 501 according to an embodiment of the present disclosure. The imaging apparatus 501 of the embodiment of the present disclosure is equipped with a camera section 541 having the imaging lens L according to the embodiment of the present disclosure and an image sensor 100 (refer to FIG. 1) such as a CCD that outputs image signals corresponding to optical images formed by the imaging lens L. The image sensor 100 is provided at an image formation plane (imaging surface R14) of the imaging lens L.

Various optical members CG may be provided between the fifth lens L5 and the image sensor 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects may be utilized as the optical member CG.

Alternatively, the optical member CG may be omitted, and a coating may be administered on the fifth lens L5 to obtain the same effect as that of the optical member CG. Thereby, the number of parts can be reduced, and the total length can be shortened.

It is preferable for the imaging lens L to be equipped with an aperture stop St positioned at the object side of the object-side surface of the second lens L2. By positioning the aperture stop St at the object side of the object-side surface of the second lens L2 in this manner, increases in the incident angles of light rays that pass through the optical system and enter the image formation plane (image sensor) can be suppressed, particularly at peripheral portions of an imaging region. It is preferable for the apertures stop St to be positioned at the object side of the object-side surface of the first lens L1 in order to cause this advantageous effect to become more prominent. Note that the expression "positioned at the object side of the object-side surface of the second lens" means that the position of the aperture stop in the direction of the optical axis is at the same position as the intersection of marginal axial rays of light and the object-side surface of the second lens L2, or at the object side of this position. Similarly, the expression "positioned at the object side of the object-side surface of the first lens" means that the position of the aperture stop in the direction of the optical axis is at the same position as the intersection of marginal axial rays of light and the object-side surface of the first lens L1, or at the object side of this position.

Further, it is preferable for the aperture stop St to be positioned at the image side of the vertex of a surface of the first lens L1 when the aperture stop St is positioned at the object side of the object-side surface of the first lens L1 along the optical axis. By positioning the aperture stop St at the image side of the vertex of the surface of the first lens L1 in this manner, the total length of the imaging lens including the aperture stop St can be shortened. Note that the imaging lenses according to the first embodiment through the fourth embodiment (FIG. 1 through FIG. 4) are the examples of the configurations in which the aperture stop St is positioned at the object side of the object-side surface of the first lens L1, and the aperture stop St is positioned at the image side of the vertex of the surface of the first lens L1. In addition, the aperture stop St may be positioned at the object side of the vertex of the surface of the first lens L1, but not limited to the present embodiment. Positioning the aperture stop St at the object side of the vertex of the surface of the first lens L1 is slightly more disadvantageous from the viewpoint of securing the amount of peripheral light rays compared to a case in which the aperture stop St is positioned at the image side of the vertex of the surface of the first lens L1. However, increases in the incident angles of light rays that pass through the optical system and enter the image formation surface (image sensor) at the peripheral portions of the imaging region can be more favorably suppressed.

In this imaging lens L, the first lens L1 has a positive refractive power in the vicinity of the optical axis and a meniscus shape with a convex surface toward the object side in the vicinity of the optical axis. The first lens L1, i.e., the most-object-side lens has a positive refractive power in the vicinity of the optical axis and a meniscus shape with a convex surface toward the object side in the vicinity of the optical axis as shown in the first embodiment through the fourth embodiment. Thereby, total length can be favorably shortened. Further, the position of the rearward principal point of the first lens L1 can be closer to the object side in the case that the first lens L1 is of a biconvex shape with a surface having a paraxial radius of curvature with the smaller absolute value toward the object side compared to a case in which the first lens L1 is of a biconvex shape with a surface having a paraxial radius of curvature with the smaller absolute value toward the image side. Therefore, the total length can be favorably shortened.

The second lens L2 has a negative refractive power in the vicinity of the optical axis. Thereby, spherical aberration and longitudinal chromatic aberration generated when the light rays pass through the first lens L1 can be favorably corrected. Further, the second lens L2 has a biconcave shape in the vicinity of the optical axis. In order to realize a second lens having a negative refractive power of approximately the same strength in the vicinity of the optical axis, the absolute value of the paraxial radius of curvature of the second lens L2 can be relatively increased in the case that the second lens L2 is of a biconcave shape in the vicinity of the optical axis compared to a case in which the second lens L2 is of a meniscus shape in the vicinity of the optical axis. For this reason, the occurrence of spherical aberration can be more favorably suppressed by the second lens L2 being of a biconcave shape in the vicinity of the optical axis. Further, the second lens L2 is of a biconcave shape in the vicinity of the optical axis and has the surface having the paraxial radius of curvature with the smaller absolute value toward the image side, as shown in the first embodiment through the fourth embodiment. For this reason, spherical aberration can be favorably corrected by the second lens L2 being of a biconcave shape in the vicinity of the optical axis. Further, the position of the rearward principal point of the second lens L2 can be closer to the object side by the surface having the paraxial radius of curvature with the smaller absolute value facing toward the image side. Therefore, the total length can be more favorably shortened.

It is preferable for the third lens L3 to have a positive refractive power in the vicinity of the optical axis. Thereby, spherical aberration can be more favorably corrected. In addition, the third lens L3 is of a meniscus shape with a convex surface toward the object side in the vicinity of the optical axis, as shown in the first embodiment through the fourth embodiment. In the case that the third lens L3 is of a meniscus shape with a convex surface toward the object side in the vicinity of the optical axis, the position of the rearward principal point of the third lens L3 can be more suitably closer to the objet side, and the shortened total length can be preferably realized.

The fourth lens L4 has a negative refractive power in the vicinity of the optical axis. By the fourth lens L4 and the fifth lens L5 to be described below having negative refractive powers in the vicinity of the optical axis, the imaging lens L can be a telephoto-type configuration as a whole, in which the first lens L1 through the third lens L3 are considered to be one optical system having a positive refractive power and the fourth lens L4 and the fifth lens L5 are considered to be one optical system having a negative refractive power. Thereby, the position of the rearward principal point of the imaging lens as a whole can be closer to the objet side, and the total length can be suitably shortened. Further, the fourth lens L4 is of a meniscus shape with a convex surface toward the image side in the vicinity of the optical axis as shown in the first embodiment through the fourth embodiment. Thereby, astigmatism can be favorably corrected.

The fifth lens L5 has a negative refractive power in the vicinity of the optical axis. As describe above, by disposing a lens having a negative refractive power in the vicinity of the optical axis at the most-image side of the imaging lens, a telephoto-type imaging lens can be favorably configured as a whole, and the total length can be suitably shortened. In addition, by the fifth lens L5 having a negative refractive power in the vicinity of the optical axis, field curvature can be favorably corrected. Further, the fifth lens L5 has a meniscus surface with a concave surface toward the image side in the vicinity of the optical axis, as shown in the first embodiment through the fourth embodiment. Thereby, the total length can be more preferably shortened, and field curvature can be favorably corrected.

Further, the fifth lens L5 has at least one inflection point within the effective diameter of the image-side surface. The term "inflection point" on the image-side surface of the fifth lens L5 refers to a point at which the image-side surface shape of the fifth lens L5 changes from a convex shape to a concave shape (or from a concave shape to a convex shape) with respect to the image side. The inflection point may be provided at any radially outward positions from the optical axis within the effective diameter of the image-side surface of the fifth lens L5. It is preferable for the inflection point to be provided at positions within a range from 40% to 70% of the maximum effective diameter of the fifth lens L5 in a radially outward direction from the optical axis. Configuring the image-side surface of the fifth lens L5 to be of a shape having at least one inflection point as shown in the first embodiment through the fourth embodiment can suppress increases in the incident angles of light rays that pass through the optical system and enter the image formation plane (image sensor) particularly at peripheral portions of an imaging region. Note that the peripheral portions herein refer to portions which are radially outward from positions at approximately 50% to 70% of the maximum effective diameter of the lens, radially outward from the optical axis.

In the imaging lens L1 described above, the configuration of each lens element of the first lens through the fifth lens is optimized within a lens configuration having five lenses as a whole. Therefore, a lens system that achieves shortening the total length and has high resolution can be realized.

In this imaging lens L, it is preferable for an aspherical surface to be applied for at least one surface of each lens of the first lens L1 through the fifth lens L5 in order to achieve improved imaging performance.

Further, it is preferable for each of the lens L1 through the lens L5 that constitute the imaging lens L to be not a cemented lens but a single lens. This is because the number of aspherical surface lenses is greater than a case in which any of the lenses L1 through L5 is a cemented lens, thereby a degree of freedom for design of each lens will increase to achieve the shortened total length favorably.

Next, the operation and effects regarding the conditional formulae of the imaging lens L configured as described above will be described in detail.

First, it is preferable for the focal length f of the entire system and the combined focal length f45 of the fourth lens L4 and the fifth lens L5 to satisfy conditional formula (1) below:

$$-0.7<f/f45<-0.1 \quad (1).$$

Conditional formula (1) defines a preferable range of numerical values for the ratio of the focal length f at the entire system with respect to the combined focal length of the fourth lens L4 and the fifth lens L5. When the value of f/f45 falls below the lower limit defined by conditional formula (1), the negative refractive powers of the fourth lens L4 and the fifth lens L5 will become excessively strong with respect to the refractive power of the entire system. Thereby, it will become difficult to sufficiently suppress increase in the incident angles of light rays that pass through the optical system and enter the image formation plane (image sensor) particularly at the intermediate angle of view. In addition, when the value of f/f45 exceeds the upper limit defined by conditional formula (1), the negative refractive powers of two lenses, the fourth lens L4 and the fifth lens L5 will become excessively weak with respect to the refractive power of the entire system. Thereby, it will become difficult to cause the position of the rearward principal point to be sufficiently closer to the object side, which is disadvantageous from the viewpoint of shortening the total length. Therefore, the position of the rearward principal point can be sufficiently closer to the object side while the total length can be favorably shortened by conditional formula (1) being satisfied. Further, increase in the incident angles of light rays that pass through the optical system and enter the image formation plane (image sensor) can be suppressed, particularly at peripheral portions of an imaging region. It is preferable for conditional formula (1-1) to be satisfied in order to cause this advantageous effect to become more prominent:

$$-0.45<f/f45<-0.23 \quad (1-1).$$

Further it is preferable for the focal length f of the entire system, a half angle of view ω, the paraxial radius of curvature R5r of the image-side surface of the fifth lens to satisfy conditional formula (2) below:

$$0.5<f\cdot\tan\omega/R5r<10 \quad (2).$$

Conditional formula (2) defines a preferable range of numerical values for the ratio of the paraxial image height (f·tan ω) with respect to the paraxial radius of curvature R5r of the image-side surface of the fifth lens L5. When the value of f·tan ω/R5r falls below the lower limit defined by conditional formula (2), the absolute value of the paraxial radius of curvature R5r of the image-side surface of the fifth lens, i.e., the most-image side surface of the imaging lens, will become excessively large with respect to the paraxial image height (f·tan ω). Thereby, it will become difficult to correct field curvature sufficiently while achieving the shortened total length. Further, when the value of f·tan ω/R5r exceeds the upper limit defined by conditional formula (2), the absolute value of the paraxial radius of curvature R5r of the image-side surface of the fifth lens, i.e., the most-image side surface of the imaging lens, will become excessively small with respect to the paraxial image height (f·tan ω). Thereby, it will become difficult to suppress increase in the incident angles of light rays that pass through the optical system and enter the image formation plane (image sensor) at the intermediate angle of view. For this reason, the increase in the incident angles of light rays that pass through the optical system and enter the image formation plane (image sensor) at the intermediate angle of view can be favorably suppressed while the total length can be shortened, by the range defined by conditional formula (2) being satisfied. Further, field curvature can be favorably corrected. It is preferable for conditional formula (2-1) to be satisfied in order to cause this advantageous effect to become more prominent:

$$1.5<f\cdot\tan\omega/R5r<4.5 \quad (2-1).$$

It is preferable for the focal length f3 of the third lens L3 and the focal length f1 of the first lens L1 to satisfy conditional formula (3) below:

$$1<f3/f1<12 \quad (3).$$

Conditional formula (3) defines a preferable range of numerical values for the ratio of the focal length f3 of the third lens L3 with respect to the focal length f1 of the first lens L1. When the value of f3/f1 falls below the lower limit defined by conditional formula (3), the refractive power of the third lens L3 will become excessively strong with respect to the refractive power of the first lens L1. Thereby, it will become difficult to realize a shortened total length. When the value of f3/f1 exceeds the upper limit defined by conditional formula (3), the refractive power of the third lens L3 will become excessively weak with respect to the refractive power of the first lens L1. Thereby, it will become difficult to correct spherical aberration favorably. For this reason, the total length can be shortened while spherical aberration can be favorably corrected by the range defined by conditional formula (3) being satisfied. It is preferable for conditional formula (3-1) to be satisfied in order to cause this advantageous effect to become more prominent:

$$2<f3/f1<10 \quad (3-1).$$

It is preferable for the paraxial radius of curvature R3f of the object-side surface of the third lens L3 and the paraxial radius of curvature R3r of the image-side surface of the third lens L3 to satisfy conditional formula (4) below:

$$-1<(R3f-R3r)/(R3f+R3r)<0 \quad (4).$$

Conditional formula (4) respectively defines preferable ranges of numerical values for the paraxial radius of curvature R3f of the object-side surface of the third lens L3 and the paraxial radius of curvature R3r of the image-side surface of the third lens L3. When the value of (R3f−R3r)/(R3f+R3r) falls below the lower limit defined by conditional formula (4), such a configuration is disadvantageous from the viewpoint of shortening the total length. When the value of (R3f−R3r)/(R3f+R3r) exceeds the upper limit defined by conditional formula (4), it will become difficult to correct spherical aberration. Therefore, satisfying conditional formula (4) enables the shortened total length to be achieved suitably and spherical aberration to be corrected favorably. It is more preferable for conditional formula (4-1) below to be satisfied in order to cause this advantageous effect to become more prominent:

$$-0.7<(R3f-R3r)/(R3f+R3r)<0 \quad (4-1).$$

Further, it is preferable for the paraxial radius of curvature R3f of the object-side surface of the third lens L3 and the paraxial radius of curvature R2r of the image-side surface of the second lens L2 to satisfy conditional formula (5) below:

$$0<(R2r-R3f)/(R2r+R3)0<1 \quad (5).$$

Conditional formula (5) respectively defines preferable ranges of numerical values for the paraxial radius of curvature R3f of the object-side surface of the third lens L3 and the paraxial radius of curvature R2r of the image-side surface of the second lens L2. In both of the case that the value of (R2r−R3f)/(R2r+R3f) exceeds the upper limit defined by conditional formula (5) and the case that the value of (R2r−R3f)/(R2r+R3f) falls below the lower limit defined by conditional formula (5), the occurrence of comatic aberration will be likely to be induced due to increase in the absolute value of offense against the sine condition. Thereby, it will become difficult to correct comatic aberration sufficiently. Therefore, satisfying conditional formula (5) enables the increase in the absolute value of offense against the sine condition to be suppressed so as to set offense against the sine condition appropriately particularly at a small angle of view. Thereby, comatic aberration can be favorably corrected. It is more preferable for conditional formula (5-1) below to be satisfied in order to cause this advantageous effect to become more prominent:

$$0<(R2r-R3f)/(R2r+R3f)<0.5 \quad (5\text{-}1).$$

It is preferable for the focal length f1 of the first lens L1 and the focal length f of the entire system to satisfy conditional formula (6) below:

$$0.8<f/f1<1.5 \quad (6).$$

Conditional formula (6) defines a preferable range of numerical values for the ratio of the focal length f of the entire system with respect to the focal length f1 of the first lens L1. When the value of f/f1 falls below the lower limit defined by conditional formula (6), a positive refractive power of the first lens L1 will become excessively weak with respect to the refractive power of the entire system. Thereby, it will become difficult to realize the shortened total length. When the value of f/f1 exceeds the upper limit defined by conditional formula (6), the positive refractive power of the first lens L1 will become excessively strong with respect to the refractive power of the entire system. Thereby, it will become difficult to correct particularly spherical aberration. Therefore, satisfying the range defined by conditional formula (6) can achieve the shortened total length while correcting spherical aberration favorably. It is more preferable for conditional formulae (6-1) through (6-3) to be satisfied in order to cause this advantageous effect to become more prominent:

$$0.9<f/f1<1.4 \quad (6\text{-}1),$$

$$0.8<f/f1\leq1.268 \quad (6\text{-}2), \text{ and}$$

$$0.9<f/f1\leq1.268 \quad (6\text{-}3).$$

Further, it is preferable for the focal length f3 of the third lens L3 and the focal length f of the entire system to satisfy conditional formula (7) below:

$$0.1<f/f3<0.6 \quad (7).$$

Conditional formula (7) defines a preferable range of numerical values for the ratio of the focal length f of the entire system with respect to the focal length f3 of the third lens L3. When the value of f/f3 falls below the lower limit defined by conditional formula (7), the refractive power of the third lens L3 will become excessively weak with respect to the refractive power of the entire system. Thereby, it will become difficult to shorten the total length. When the value of f/f3 exceeds the upper limit defined by conditional formula (7), the refractive power of the third lens L3 will become excessively strong with respect to the refractive power of the entire system. Thereby, it will become difficult to correct spherical aberration. Therefore, satisfying the range defined by conditional formula (7) enables the shortened total length and spherical aberration to be corrected favorably. It is more preferable for conditional formula (7-1) to be satisfied in order to cause this advantageous effect to become more prominent:

$$0.1<f/f3<0.5 \quad (7\text{-}1).$$

It is preferable for the focal length f2 of the second lens L2 and the focal length f of the entire system to satisfy conditional formula (8) below:

$$-1<f/f2<-0.2 \quad (8).$$

Conditional formula (8) defines a preferable range of numerical values for the ratio of the focal length f of the entire system with respect to the focal length f2 of the second lens L2. When the value of f/f2 falls below the lower limit defined by conditional formula (8), the refractive power of the second lens L2 will become excessively strong with respect to the positive refractive power of the entire system, and shortening of the total length will become difficult. When the value of f/f2 exceeds the upper limit defined by conditional formula (8), the refractive power of the second lens L2 will become excessively weak with respect to the refractive power of the entire system, and correction of longitudinal chromatic aberration will become difficult. Therefore, the total length can be shortened, while longitudinal chromatic aberration can be corrected favorably, by the range defined by conditional formula (8) being satisfied. It is more preferable for conditional formula (8-1) to be satisfied in order to cause this advantageous effect to become more prominent:

$$-0.8<f/f2<-0.4 \quad (8\text{-}1).$$

Further, it is preferable for the distance D7 between the third lens L3 and the fourth lens L4 along the optical axis and the focal length f of the entire system to satisfy conditional formula (9) below:

$$0.05<D7/f<0.2 \quad (9).$$

Conditional formula (9) defines a preferable range of numerical values for the ratio of the distance D7 between the third lens L3 and the fourth lens L4 along the optical axis with respect to the focal length f of the entire system. As described above, the imaging lens according to the present embodiment is configured to be a telephoto type as a whole when the first lens L1 through the third lens L3 are considered one optical system (a first lens group) having a positive refractive power while the fourth lens L4 through the fifth lens L5 are considered one optical system (a second lens group) having a negative refractive power. When the value of D7/f falls below the lower limit defined by conditional formula (9), the distance between the first lens group and the second lens group along the optical axis will become excessively small. This will diminish the advantageous effect from the viewpoint of shortening the total length obtained by configuring the imaging lens L to be a telephoto type as described above. In addition, when the value of D7/f exceeds the upper limit defined by conditional formula (9), it will be likely to become necessary to increase the negative refractive power of the second lens group with respect to the positive refractive power of the first lens group, and it will become difficult to correct astigmatism favorably. Therefore, the total length can be shortened and astigmatism can be corrected favorably, by the range defined by conditional formula (9) being satisfied.

As described above, in the imaging lenses of the embodiments of the present disclosure, the configuration of each lens element is optimized within a lens configuration having five lenses as a whole. Therefore, a lens system that can achieve a shortened total length while having high imaging performance can be realized.

Further, improved imaging performance can be realized by appropriately satisfying preferred conditions. In addition, the imaging apparatuses according to the embodiments of the present disclosure output image signals corresponding to optical images formed by the high performance imaging lenses according to the embodiments of the present disclosure. Therefore, photographed images having high resolution from a central angle of view to peripheral angles of view can be obtained.

Next, specific examples of numerical values of the imaging lens of the present disclosure will be described. A plurality of examples of numerical values will be summarized and explained below.

Table 1 and Table 2 below show specific lens data corresponding to the configuration of the imaging lens illustrated in FIG. 1. Specifically, Table 1 shows basic lens data of the imaging lens, and Table 2 shows data related to aspherical surfaces. In the lens data of Table 1, ith numbers of the surfaces of lens elements that sequentially increase from the object side to the image side, with the lens element at the most object side designated as first (the aperture stop St is first), are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1 st surface Si+1 from the object side along the optical axis Z are shown in the column Di. The refractive indices of jth optical elements from the object side with respect to the d line (wavelength: 587.56 nm) are shown in the column Ndj. The Abbe's numbers of the jth optical elements with respect to the d line are shown in the column vdj. In addition, Table 1 also shows the focal length f (mm) of the entire system and the back focus BF (mm) as various data. Note that the back focus BF is represented as an air converted value.

In the imaging lens of Example 1, both of the surfaces of all of the first lens L1 through the fifth lens L5 are aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "1.0·10$^{-2}$".

The values of coefficients Ai and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = C \cdot h^2 / \{1 + (1 - KA \cdot C^2 \cdot h^2)^{1/2}\} + \Sigma Ai \cdot h^i \quad (A)$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (i is an integer 3 or greater), and KA is an aspherical surface coefficient.

Table 3 through Table 8 show specific lens data corresponding to the configurations of the imaging lenses illustrated in FIG. 2 through FIG. 4 as Example 2 through Example 4, in the same manner as the imaging lens of Example 1 above. In each of the imaging lenses according to Examples 1 through 4, both surfaces of the first lens L1 through the fifth lens L5 are of aspherical surface shapes.

A through E of FIG. 6 are diagrams that illustrate aberrations of the imaging lens of Example 1, wherein the diagrams respectively illustrate spherical aberration, offense against the sine condition, astigmatism, distortion, and lateral chromatic aberration (chromatic aberration of magnification) of the imaging lens of Example 1. Each of the diagrams that illustrate spherical aberration, offense against the sine condition, astigmatism (field curvature), and distortion illustrate aberrations using the d line (wavelength: 587.56 nm) as a reference wavelength. The diagrams that illustrate spherical aberration and lateral chromatic aberration also show aberrations related to the F line (wavelength: 486.1 nm) and the C line (wavelength: 656.27 nm). In addition, the diagram that illustrates spherical aberration also shows aberration related to the g line (wavelength: 435.83 nm). In the diagram that illustrates astigmatism, aberration in the sagittal direction S is indicated by a solid line, while aberration in the tangential direction T is indicated by a broken line. In addition, "Fno." denotes an F number, and "ω" denotes a half angle of view.

Similarly, various aberrations of the imaging lenses of Example 2 through Example 4 are illustrated in A through E of FIG. 7 through A through E of FIG. 9.

Further, Table 9 shows values corresponding to conditional formulae (1) through (9) according to the present disclosure, which are respectively summarized for each of Examples 1 through 4.

Note that the imaging lens of the present disclosure is not limited to the embodiments and each of the Examples, and various modifications are possible. For example, the values of the radii of curvature, the distances among surfaces, the refractive indices, the Abbe's numbers, the aspherical surface coefficients of the respective lens components, etc., are not limited to the numerical values indicated in connection with the Examples of numerical values, and may be other values.

In addition, the Examples are described under the presumption that the imaging lenses are to be utilized with fixed focus. However, it is also possible for configurations capable of adjusting focus to be adopted. It is also possible to adopt a configuration, in which the entirety of the lens system is fed out or a portion of the lenses is moved along the optical axis to enable automatic focus, for example. In each lens having a meniscus shape in the vicinity of the optical axis within the imaging lens of the present disclosure, the surface having the paraxial radius of curvature with the greater absolute value within the meniscus shape may be configured to be planar in the vicinity of the optical axis. In other words, a lens of a meniscus shape in the vicinity of the optical axis may be of a plano-convex shape or of a plano-concave shape in which the surface having the radius of curvature with the greater absolute value within the meniscus shape of the lens is planar in the vicinity of the optical axis.

TABLE 1

EXAMPLE 1
f = 3.885, Bf = 1.003

| Si | Ri | Di | Ndj | vdj |
|---|---|---|---|---|
| 1(Aperture Stop) | ∞ | −0.150 | | |
| *2 | 1.55991 | 0.640 | 1.54488 | 54.87 |
| *3 | 8.99307 | 0.162 | | |
| *4 | −68.00613 | 0.320 | 1.63351 | 23.63 |
| *5 | 4.72827 | 0.376 | | |
| *6 | 4.16258 | 0.415 | 1.54488 | 54.87 |
| *7 | 17.24976 | 0.521 | | |
| *8 | −4.25003 | 0.419 | 1.63351 | 23.63 |
| *9 | −5.66233 | 0.074 | | |
| *10 | 1.24948 | 0.544 | 1.54488 | 54.87 |
| *11 | 0.90833 | 0.567 | | |
| 12 | ∞ | 0.145 | 1.51633 | 64.14 |
| 13 | ∞ | 0.340 | | |
| 14 | ∞ | | | |

*Aspherical Surface

TABLE 2

EXAMPLE 1 Aspherical Surface Data

| Surface Numbers | KA | A3 | A4 | A5 | A6 |
|---|---|---|---|---|---|
| 2 | −1.6563005E+01 | −9.3156650E−03 | 6.8677112E−01 | −8.3010733E−01 | 1.5587319E+00 |
| 3 | −9.4945267E+01 | 5.3452688E−03 | −1.2771812E−01 | 4.5184761E−01 | −1.2412990E+00 |
| 4 | −9.1752496E−01 | 2.5210800E−02 | −3.1863205E−01 | 5.6522072E−01 | 4.4991762E−03 |
| 5 | −7.0332054E−01 | 4.0717722E−02 | −3.7503054E−01 | 1.1956866E+00 | −2.2439481E+00 |
| 6 | −1.4000364E+02 | −7.8678012E−02 | 7.5961359E−01 | −2.2362499E+00 | 2.7437731E+00 |
| 7 | 9.9928482E−01 | 3.3157598E−02 | −1.0224920E−01 | −1.4662191E−02 | 2.4551509E−01 |
| 8 | −6.6128708E+01 | −2.6325577E−02 | 4.7766280E−01 | −8.7082758E−01 | 1.1277945E+00 |
| 9 | −9.3974402E+00 | −2.1298059E−01 | −2.0709244E−01 | 1.2196422E+00 | 1.2862826E+00 |
| 10 | −4.9691843E+01 | 3.0433055E−01 | −6.7710927E−01 | −2.4116343E−01 | 1.5196922E+00 |
| 11 | −2.9753541E+00 | 1.7624424E−01 | −1.3314159E+00 | 2.6516925E+00 | −2.9969790E+00 |

| | A7 | A8 | A9 | A10 | A11 |
|---|---|---|---|---|---|
| 2 | −8.3277242E+00 | 2.1950992E+01 | −2.5963350E+01 | 7.9312283E+00 | 8.0843651E+00 |
| 3 | 7.6076277E−01 | 2.9534247E+00 | −5.7000033E+00 | 1.2994379E+00 | 4.3640177E+00 |
| 4 | −2.2542346E+00 | 2.4154933E+00 | 5.0707020E+00 | −9.5965108E+00 | −3.5591981E+00 |
| 5 | 1.8206815E+00 | 1.6023010E+00 | −4.1227864E+00 | 3.0390906E+00 | −2.8474884E+00 |
| 6 | −2.7964153E−01 | −2.4000051 E+00 | −2.1532469E+00 | 1.1230270E+01 | −1.0954020E+01 |
| 7 | −7.4117267E−01 | 1.2111541E+00 | −1.8153487E+00 | 1.7531053E+00 | −3.4956635E−01 |
| 8 | −7.5033010E−01 | −3.4688858E−01 | 6.4311663E−01 | −1.0948005E−01 | −1.9382824E−01 |
| 9 | −8.0219147E+00 | 1.2582168E+01 | −9.9304099E+00 | 2.8036403E+00 | 1.9162612E+00 |
| 10 | −1.4168644 E+00 | 4.3931737E−01 | −1.8405498E−01 | 2.8898581E−01 | −1.3603927E−01 |
| 11 | 1.7907063E+00 | −3.5995046E−02 | −7.9297113E−01 | 5.4611529E−01 | −1.2791104E−01 |

| | A12 | A13 | A14 | A15 | A16 |
|---|---|---|---|---|---|
| 2 | 2.3578492E+00 | −1.6272391E+01 | 9.8678892E+00 | 4.2543055E−01 | −1.3030601E+00 |
| 3 | −2.7822758E+00 | −9.1053177E−01 | 6.4716974E−01 | 4.3392290E−01 | −2.3715292E−01 |
| 4 | 1.7155255E+01 | −8.5725042E+00 | −6.1175690E+00 | 6.9397336E+00 | −1.7852751E+00 |
| 5 | 5.2759586E+00 | −5.2163310E+00 | 1.8275321E+00 | 4.7378423E−01 | −3.9196321E−01 |
| 6 | 2.2098004E+00 | 5.3790225E−01 | 2.5421408E+00 | −2.6311111E+00 | 6.8296089E−01 |
| 7 | −4.2480231E−01 | −7.7981451E−02 | 1.3432176E−01 | 1.8229000E−01 | −1.0945871E−01 |
| 8 | 2.2966933E−01 | −2.4829162E−01 | 1.6972793E−01 | −5.9588467E−02 | 9.4995395E−03 |
| 9 | −1.8505842E+00 | 2.3626104E−01 | 3.2879103E−01 | −1.5996992E−01 | 2.2544132E−02 |
| 10 | −9.5422991E−03 | 2.6766154E−02 | −1.3635445E−02 | 4.7231926E−03 | −7.2578477E−04 |
| 11 | 1.8647706E−03 | −1.2074949E−02 | 1.2333190E−02 | −3.6794777E−03 | 3.7338118E−04 |

TABLE 3

EXAMPLE 2
f = 3.870, Bf = 1.007

| Si | Ri | Di | Ndj | vdj |
|---|---|---|---|---|
| 1(Aperture Stop) | ∞ | −0.150 | | |
| *2 | 1.56322 | 0.636 | 1.54488 | 54.87 |
| *3 | 8.00000 | 0.162 | | |
| *4 | −68.00559 | 0.320 | 1.63351 | 23.63 |
| *5 | 5.08086 | 0.375 | | |
| *6 | 4.09041 | 0.416 | 1.54488 | 54.87 |
| *7 | 17.73310 | 0.521 | | |
| *8 | −4.24994 | 0.419 | 1.63351 | 23.63 |
| *9 | −5.65023 | 0.074 | | |
| *10 | 1.25477 | 0.542 | 1.54488 | 54.87 |
| *11 | 0.91005 | 0.567 | | |
| 12 | ∞ | 0.145 | 1.51633 | 64.14 |
| 13 | ∞ | 0.345 | | |
| 14 | ∞ | | | |

*Aspherical Surface

TABLE 4

EXAMPLE 2 Aspherical Surface Data

| Surface Numbers | KA | A3 | A4 | A5 | A6 |
|---|---|---|---|---|---|
| 2 | −1.6563008E+01 | −8.2209044E−03 | 6.8471408E−01 | −8.3640102E−01 | 1.5668189E+00 |
| 3 | −9.4945264E+01 | 2.8337480E−03 | −1.2535991E−01 | 4.6794192E−01 | −1.2465842E+00 |
| 4 | −9.1752482E−01 | 2.3219204E−02 | −3.1816489E−01 | 5.6940918E−01 | 2.3890765E−03 |
| 5 | −7.0331562E−01 | 4.3883764E−02 | −3.7722020E−01 | 1.1705731E+00 | −2.2199122E+00 |
| 6 | −1.4000315E+02 | −7.9746641E−02 | 7.6808228E−01 | −2.2298675E+00 | 2.7246384E+00 |
| 7 | 9.9929070E−01 | 3.5483956E−02 | −1.0271064E−01 | −2.1353492E−02 | 2.5615502E−01 |
| 8 | −6.6128695E+01 | −2.5805114E−02 | 4.9538408E−01 | −9.0883072E−01 | 1.1147555E+00 |
| 9 | −9.3974386E+00 | −2.1432000E−01 | −2.0242092E−01 | 1.2212330E+00 | 1.2844157E+00 |
| 10 | −4.9691842E+01 | 2.8362733E−01 | −6.6765901E−01 | −2.0100780E−01 | 1.5068955E+00 |
| 11 | −2.9753558E+00 | 1.6403819E−01 | −1.3177993E+00 | 2.6541646E+00 | −3.0049876E+00 |

| | A7 | A8 | A9 | A10 | A11 |
|---|---|---|---|---|---|
| 2 | −8.3105809E+00 | 2.1930120E+01 | −2.5991378E+01 | 7.9640311E+00 | 8.1118281E+00 |
| 3 | 7.1744563E−01 | 2.9561028E+00 | −5.6377632E+00 | 1.3074156E+00 | 4.3142109E+00 |
| 4 | −2.2679446E+00 | 2.4132241E+00 | 5.0976872E+00 | −9.5856863E+00 | −3.5850624E+00 |
| 5 | 1.9104099E+00 | 1.4969268E+00 | −4.2947657E+00 | 3.2637318E+00 | −2.6633281E+00 |
| 6 | −2.9685206E−01 | −2.3708663E+00 | −2.1298943E+00 | 1.1208134E+01 | −1.0970794E+01 |
| 7 | −7.3095473E−01 | 1.1883825E+00 | −1.8246839E+00 | 1.7768293E+00 | −3.4466287E−01 |
| 8 | −6.6855098E−01 | −3.5677427E−01 | 5.6286547E−01 | −8.5430384E−02 | −1.5314109E−01 |
| 9 | −8.0163077E+00 | 1.2582810E+01 | −9.9378805E+00 | 2.8030474E+00 | 1.9200571E+00 |
| 10 | −1.4544656E+00 | 4.4907880E−01 | −1.6539035E−01 | 2.8471051E−01 | −1.4103274E−01 |
| 11 | 1.7967229E+00 | −3.8151153E−02 | −7.9696262E−01 | 5.4897208E−01 | −1.2690791E−01 |

| | A12 | A13 | A14 | A15 | A16 |
|---|---|---|---|---|---|
| 2 | 2.3286319E+00 | −1.6287362E+01 | 9.8818267E+00 | 4.2868827E−01 | −1.3057230E+00 |
| 3 | −2.7966579E+00 | −8.8965433E−01 | 6.5632324E−01 | 4.3034395E−01 | −2.3925462E−01 |
| 4 | 1.7146224E+01 | −8.5605851E+00 | −6.1160908E+00 | 6.9376536E+00 | −1.7847865E+00 |
| 5 | 5.0279288E+00 | −5.3202901E+00 | 1.9644341E+00 | 4.9776649E−01 | −4.2182173E−01 |
| 6 | 2.2155047E+00 | 5.4372686E−01 | 2.5435778E+00 | −2.6319201E+00 | 6.8226852E−01 |
| 7 | −4.3834259E−01 | −7.9342117E−02 | 1.3832960E−01 | 1.8244614E−01 | −1.0994210E−01 |
| 8 | 2.1320631E−01 | −2.5863264E−01 | 1.7468219E−01 | −5.8546682E−02 | 8.9393268E−03 |
| 9 | −1.8502030E+00 | 2.3538706E−01 | 3.2868687E−01 | −1.5989432E−01 | 2.2553614E−02 |
| 10 | −8.4776399E−03 | 2.7447946E−02 | −1.3775655E−02 | 4.6858878E−03 | −7.1822605E−04 |
| 11 | 9.9468139E−04 | −1.2185724E−02 | 1.2444616E−02 | −3.6748487E−03 | 3.6805944E−04 |

TABLE 5

EXAMPLE 3
f = 4.135, Bf = 1.058

| Si | Ri | Di | Ndj | νdj |
|---|---|---|---|---|
| 1(Aperture Stop) | ∞ | −0.153 | | |
| *2 | 1.65477 | 0.728 | 1.54488 | 54.87 |
| *3 | 19.85773 | 0.101 | | |
| *4 | −11.94678 | 0.357 | 1.63351 | 23.63 |
| *5 | 6.90472 | 0.443 | | |
| *6 | 3.47501 | 0.435 | 1.54488 | 54.87 |
| *7 | 5.34619 | 0.509 | | |
| *8 | −4.34377 | 0.407 | 1.63351 | 23.63 |

TABLE 5-continued

EXAMPLE 3
f = 4.135, Bf = 1.058

| Si | Ri | Di | Ndj | νdj |
|---|---|---|---|---|
| *9 | −6.19729 | 0.083 | | |
| *10 | 1.43578 | 0.625 | 1.54488 | 54.87 |
| *11 | 1.10635 | 0.579 | | |
| 12 | ∞ | 0.146 | 1.51633 | 64.14 |
| 13 | ∞ | 0.382 | | |
| 14 | ∞ | | | |

*Aspherical Surface

TABLE 6

EXAMPLE 3 Aspherical Surface Data

| Surface Numbers | KA | A3 | A4 | A5 | A6 |
|---|---|---|---|---|---|
| 2 | −1.6481980E+01 | −1.8666927E−02 | 5.8540234E−01 | −3.9092143E−01 | −7.0174915E−01 |
| 3 | −9.0265376E+01 | 7.5565381E−03 | −2.2083481E−01 | 6.8514287E−01 | −1.8568872E+00 |
| 4 | −1.0000090E+00 | −1.7494888E−04 | −1.2661413E−01 | −2.8434311E−01 | 2.9604469E+00 |
| 5 | 2.5183678E−01 | 7.7678752E−02 | −5.4001643E−01 | 1.7637600E+00 | −3.4418274E+00 |
| 6 | −1.4284198E+02 | −2.5402127E−02 | 7.6288927E−01 | −2.1487582E+00 | 2.0770727E+00 |
| 7 | −3.3808509E−01 | 1.5322844E−02 | −4.0046561E−02 | 1.7418066E−01 | −3.7119406E−01 |
| 8 | −7.8275044E+01 | 2.4007922E−02 | 4.7523409E−01 | −7.3312679E−01 | 9.5730634E−01 |
| 9 | −1.1867476E+01 | 1.1545135E−01 | −7.6118212E−01 | 3.0562693E+00 | −5.6862246E+00 |
| 10 | −4.8152475E+01 | 4.7541531E−01 | −7.0715439E−01 | −2.2306201E−01 | 7.6016271E−01 |
| 11 | −2.9761528E+00 | 1.7107731E−01 | −9.2458978E−01 | 1.2373193E+00 | −2.1266773E−01 |

| | A7 | A8 | A9 | A10 | A11 |
|---|---|---|---|---|---|
| 2 | 3.7638532E−01 | 2.3719391E+00 | −2.8668046E+00 | −1.0909201E+00 | 2.6941812E+00 |
| 3 | 2.7128330E+00 | −1.3873772E+00 | 4.9354902E−02 | −3.1619479E+00 | 7.1686377E+00 |
| 4 | −8.8178130E+00 | 1.1139278E+01 | 1.5610611E+00 | −1.7122400E+01 | 4.8258297E+00 |
| 5 | 3.7132753E+00 | −1.8606259E−01 | −2.3561382E+00 | −2.0033314E+00 | 4.3133133E+00 |
| 6 | 7.7694469E−01 | −4.6410460E+00 | 6.2192980E+00 | −5.4920143E+00 | 5.4246103E+00 |
| 7 | −1.1689568E+00 | 3.9859966E+00 | −4.5303119E+00 | 2.1358565E+00 | −3.6493386E−01 |
| 8 | −1.4201261E+00 | 1.1851810E+00 | −2.9625739E−01 | −2.3600726E−01 | 1.8806844E−01 |
| 9 | 6.3907350E+00 | −4.3132795E+00 | 1.0212757E+00 | 6.5466612E−01 | −3.9703302E−01 |
| 10 | −9.7928335E−02 | −4.6741886E−01 | 1.8537931E−01 | 9.5002608E−02 | −3.9199733E−02 |
| 11 | −1.9026928E+00 | 3.1241379E+00 | −2.2610974E+00 | 6.4234652E−01 | 1.3253834E−01 |

| | A12 | A13 | A14 | A15 | A16 |
|---|---|---|---|---|---|
| 2 | 3.9556198E−01 | −1.4318923E+00 | −5.9981173E−01 | 1.1634836E+00 | −3.4714122E−01 |
| 3 | −5.1667537E+00 | 6.7290578E−01 | 9.6257662E−02 | 6.5893150E−01 | −3.3055030E−01 |
| 4 | 2.5231845E+01 | −3.0054537E+01 | 1.0022335E+01 | 2.1217080E+00 | −1.4479517E+00 |
| 5 | 3.6224318E+00 | −7.3937602E+00 | −4.7292689E−01 | 4.9878454E+00 | −1.9955140E+00 |
| 6 | −5.2624350E+00 | 2.3473799E+00 | 7.8263263E−01 | −1.1196902E+00 | 2.9060512E−01 |
| 7 | 5.2095049E−01 | −5.6003684E−01 | −2.5797416E−02 | 2.2923051E−01 | −7.3476002E−02 |
| 8 | −5.0965263E−02 | −9.5536172E−03 | 4.0780677E−02 | −3.4001278E−02 | 9.2887241E−03 |
| 9 | −1.0720214E−02 | −5.1929493E−02 | 1.1099049E−01 | −4.9875051E−02 | 7.1473802E−03 |
| 10 | −1.4556388E−02 | 2.5649583E−03 | 2.4813002E−03 | −3.8274497E−04 | −5.7413533E−05 |
| 11 | −1.2013788E−01 | −9.8779888E−05 | 1.8085903E−02 | −5.4583545E−03 | 5.2327927E−04 |

TABLE 7

EXAMPLE 4
f = 4.131, Bf = 1.066

| Si | Ri | Di | Ndj | vdj |
|---|---|---|---|---|
| 1(Aperture Stop) | ∞ | −0.153 | | |
| *2 | 1.65477 | 0.736 | 1.54488 | 54.87 |
| *3 | 20.59377 | 0.085 | | |
| *4 | −12.01401 | 0.378 | 1.63351 | 23.63 |
| *5 | 7.69109 | 0.445 | | |
| *6 | 3.47501 | 0.428 | 1.54488 | 54.87 |
| *7 | 4.34377 | 0.497 | | |
| *8 | −4.34377 | 0.400 | 1.63351 | 23.63 |
| *9 | −5.64771 | 0.083 | | |
| *10 | 1.39842 | 0.621 | 1.54488 | 54.87 |
| *11 | 1.08460 | 0.579 | | |
| 12 | ∞ | 0.146 | 1.51633 | 64.14 |
| 13 | ∞ | 0.391 | | |
| 14 | ∞ | | | |

*Aspherical Surface

TABLE 8

EXAMPLE 4 Aspherical Surface Data

| Surface Numbers | KA | A3 | A4 | A5 | A6 |
|---|---|---|---|---|---|
| 2 | −1.6482066E+01 | −1.9460890E−02 | 5.8659792E−01 | −3.8698189E−01 | −7.2049700E−01 |
| 3 | −9.0265376E+01 | 8.3637488E−03 | −2.3337063E−01 | 6.8263638E−01 | −1.7981759E+00 |
| 4 | −1.0000084E+00 | −8.4366600E−03 | −1.0841039E−01 | −2.6737324E−01 | 2.9102976E+00 |
| 5 | 2.5184850E−01 | 8.9105766E−02 | −5.4185293E−01 | 1.6969938E+00 | −3.3239569E+00 |
| 6 | −1.4284199E+02 | −1.6300540E−02 | 7.4448220E−01 | −2.1845579E+00 | 2.1300841E+00 |
| 7 | −3.3813663E−01 | −8.9899010E−03 | −2.8658867E−02 | 2.2560922E−01 | −4.6550273E−01 |
| 8 | −7.8275042E+01 | 2.8409689E−02 | 4.6600877E−01 | −7.2494999E−01 | 9.9014549E−01 |
| 9 | −1.1867475E+01 | 1.0594727E−01 | −7.5380105E−01 | 3.0734192E+00 | −5.6902781E+00 |
| 10 | −4.8152457E+01 | 4.7750035E−01 | −7.0696412E−01 | −2.2718155E−01 | 7.6052411E−01 |
| 11 | −2.9762467E+00 | 1.7050081E−01 | −9.2623053E−01 | 1.2402751E+00 | −2.1129077E−01 |

| Surface Numbers | A7 | A8 | A9 | A10 | A11 |
|---|---|---|---|---|---|
| 2 | 3.8631218E−01 | 2.4155214E+00 | −2.9118053E+00 | −1.1405151E+00 | 2.7577159E+00 |
| 3 | 2.7022163E+00 | −1.5214230E+00 | 1.2395642E−01 | −2.9902171E+00 | 7.0384966E+00 |
| 4 | −8.8065332E+00 | 1.1199646E+01 | 1.4984559E+01 | −1.7123131E+01 | 4.8895562E+00 |
| 5 | 3.9125880E+00 | −6.5426827E−01 | −2.6410760E+00 | −1.1581051E+00 | 4.5108019E+00 |
| 6 | 8.3799927E−01 | −4.7338325E+00 | 6.1611573E+00 | −5.3964784E+00 | 5.4572586E+00 |
| 7 | −1.2336467E+00 | 4.1750310E+00 | −4.4908831E+00 | 1.9446073E+00 | −3.7257324E−01 |
| 8 | −1.4445674E+00 | 1.1452778E+00 | −2.6823979E+00 | −2.1060949E+00 | 1.7289375E−01 |
| 9 | 6.3762267E+00 | −4.3128084E+00 | 1.0297982E+00 | 6.5483025E−01 | −4.0020051E−01 |
| 10 | −9.6091038E−02 | −4.6783229E−01 | 1.8553790E+00 | 9.5179545E−02 | −3.9474184E−02 |
| 11 | −1.9048365E+00 | 3.1234169E+00 | −2.2603379E+00 | 6.4260119E−01 | 1.3238112E−01 |

| Surface Numbers | A12 | A13 | A14 | A15 | A16 |
|---|---|---|---|---|---|
| 2 | 4.2610621E−01 | −1.4728438E+00 | −6.0938176E−01 | 1.1734469E+00 | −3.4597873E−01 |
| 3 | −5.2964536E+00 | 7.6350328E−01 | 1.5072971E+01 | 6.3648131E−01 | −3.4036489E−01 |
| 4 | 2.5162354E+01 | −3.0080154E+01 | 1.0082508E+01 | 2.1251345E+00 | −1.4638129E+00 |
| 5 | 2.8171158E+00 | −7.4517005E+00 | −7.8980377E−02 | 4.9914173E+00 | −2.0735433E+00 |
| 6 | −5.3191976E+00 | 2.3372497E+00 | 8.0073603E−01 | −1.1183495E+00 | 2.8820266E−01 |
| 7 | 6.2751113E−01 | −5.6211141E−01 | −5.6917359E−02 | 2.3000033E−01 | −6.9748671E−02 |
| 8 | −5.9930336E−02 | −5.7106237E−03 | 4.2435628E−02 | −3.4368828E−02 | 9.1643171E−03 |
| 9 | −1.0746720E−02 | −5.1315885E−02 | 1.1098600E−01 | −4.9921400E−02 | 7.1481347E−03 |
| 10 | −1.4595158E−02 | 2.6269135E−03 | 2.4856796E−03 | −3.8718237E−04 | −5.7618188E−05 |
| 11 | −1.2019094E−01 | −8.1022552E−05 | 1.8091578E−02 | −5.4591758E−03 | 5.2303989E−04 |

TABLE 9

Values For Conditional Formulae

| Formula Number | Conditional Formulae | EXAMPLE 1 | EXAMPLE 2 | EXAMPLE 3 | EXAMPLE 4 |
|---|---|---|---|---|---|
| 1 | f/f45 | −0.445 | −0.448 | −0.359 | −0.293 |
| 2 | f · tanω/R5r | 3.130 | 3.299 | 2.775 | 2.829 |
| 3 | f3/f1 | 2.962 | 2.802 | 5.155 | 8.339 |
| 4 | (R3f − R3r)/(R3f + R3r) | −0.611 | −0.625 | −0.212 | −0.111 |
| 5 | (R2r − R3f)/(R2r + R3f) | 0.064 | 0.108 | 0.330 | 0.378 |
| 6 | f/f1 | 1.156 | 1.123 | 1.266 | 1.268 |
| 7 | f/f3 | 0.390 | 0.401 | 0.246 | 0.152 |
| 8 | f/f2 | −0.558 | −0.520 | −0.603 | −0.562 |
| 9 | D7/f | 0.134 | 0.135 | 0.123 | 0.120 |

What is claimed is:

1. An imaging lens consisting of, in order from the object side to the image side:

a first lens having a positive refractive power and a meniscus shape with a convex surface toward the object side;

a second lens having a biconcave shape with the surface having the radius of curvature with the smaller absolute value toward the image side;

a third lens having a meniscus shape with a convex surface toward the object side;

a fourth lens having a negative refractive power and a meniscus shape with a convex surface toward the image side; and a fifth lens having a negative refractive power and a meniscus shape with a concave surface toward the image side, the image-side surface having at least one inflection point, wherein the conditional formula below is satisfied:

$$-0.45 < f/f45 < -0.23 \quad (1\text{-}1),$$

where f is the focal length of the entire system, and
f45 is the combined focal length of the fourth lens and the fifth lens.

2. The imaging lens as defined in claim 1, wherein the conditional formula below is satisfied:

$$0.8 < f/f1 < 1.5 \quad (6),$$

where f1 is the focal length of the first lens.

3. The imaging lens as defined in claim 1, wherein the conditional formula below is satisfied:

$$0.8 < f/f1 \le 1.268 \quad (6\text{-}2),$$

where f1 is the focal length of the first lens.

4. The imaging lens as defined in claim 1, wherein the conditional formula below is satisfied:

$$1 < f3/f1 < 12 \quad (3),$$

where f3 is the focal length of the third lens, and
f1 is the focal length of the first lens.

5. The imaging lens as defined in claim 1, wherein the conditional formula below is satisfied:

$$-1 < (R3f - R3r)/(R3f + R3r) < 0 \quad (4),$$

where

R3f is the paraxial radius of curvature of the object-side surface of the third lens, and
R3r is the paraxial radius of curvature of the image-side surface of the third lens.

6. The imaging lens as defined in claim 1, wherein the conditional formula below is satisfied:

$$0 < (R2r - R3f)/(R2r + R3f) < 1 \quad (5),$$

where

R2r is the paraxial radius of curvature of the image-side surface of the second lens, and
R3f is the paraxial radius of curvature of the object-side surface of the third lens.

7. The imaging lens as defined in claim 1, wherein the conditional formula below is satisfied:

$$0.1 < f/f3 < 0.6 \quad (7),$$

where f3 is the focal length of the third lens.

8. The imaging lens as defined in claim 1, wherein the conditional formula below is satisfied:

$$-1 < f/f2 < -0.2 \quad (8),$$

where f2 is the focal length of the second lens.

9. The imaging lens as defined in claim 1, wherein the conditional formula below is satisfied:

$$0.05 < D7/f < 0.2 \quad (9),$$

where

D7 is the distance between the third lens and the fourth lens along the optical axis.

10. The imaging lens as defined in claim 1, wherein the conditional formula below is satisfied:

$$2 < f3/f1 < 10 \quad (3\text{-}1),$$

where f3 is the focal length of the third lens, and f1 is the focal length of the first lens.

11. The imaging lens as defined in claim 1, wherein the conditional formula below is satisfied:

$$-0.7 < (R3f - R3r)/(R3f + R3r) < 0 \quad (4\text{-}1),$$

where

R3f is the paraxial radius of curvature of the object-side surface of the third lens, and
R3r is the paraxial radius of curvature of the image-side surface of the third lens.

12. The imaging lens as defined in claim 1, wherein the conditional formula below is satisfied:

$$0 < (R2r - R3f)/(R2r + R3f) < 0.5 \quad (5\text{-}1),$$

where

R2r is the paraxial radius of curvature of the image-side surface of the second lens, and
R3f is the paraxial radius of curvature of the object-side surface of the third lens.

13. The imaging lens as defined in claim 1, wherein the conditional formula below is satisfied:

$$0.9 < f/f1 \le 1.268 \quad (6\text{-}3),$$

where f1 is the focal length of the first lens.

14. The imaging lens as defined in claim 1, wherein the conditional formula below is satisfied:

$$0.1 < f/f3 < 0.5 \quad (7\text{-}1),$$

where f3 is the focal length of the third lens.

15. The imaging lens as defined in claim 1, wherein the conditional formula below is satisfied:

$$0.5 < f \cdot \tan \omega / R5r < 10 \quad (2),$$

where $\omega$ is a half angle of view, and
R5r is the paraxial radius of curvature of the image-side surface of the fifth lens.

16. The imaging lens as defined in claim 15, wherein the conditional formula below is satisfied:

$$1.5 < f \cdot \tan \omega / R5r < 4.5 \quad (2\text{-}1).$$

17. An imaging apparatus equipped with the imaging lens as defined in claim 1.

18. An imaging lens consisting of, in order from the object side to the image side:

a first lens having a positive refractive power and a meniscus shape with a convex surface toward the object side;

a second lens having a biconcave shape with the surface having the radius of curvature with the smaller absolute value toward the image side;

a third lens having a meniscus shape with a convex surface toward the object side;

a fourth lens having a negative refractive power and a meniscus shape with a convex surface toward the image side; and a fifth lens having a negative refractive power and a meniscus shape with a concave surface toward the image side, the image-side surface having at least one inflection point, wherein
the conditional formula below is satisfied:

$$0.8 < f/f1 \leq 1.268 \quad (6\text{-}2),$$

where
f is the focal length of the entire system, and
f1 is the focal length of the first lens.

19. The imaging lens as defined in claim 18, wherein the conditional formula below is satisfied:

$$-0.7 < f/f45 < -0.1 \quad (1),$$

where
f45 is the combined focal length of the fourth lens and the fifth lens.

20. The imaging lens as defined in claim 19, wherein the conditional formula below is satisfied:

$$-0.45 < f/f45 < -0.23 \quad (1\text{-}1).$$

* * * * *